May 19, 1970 R. S. FOW 3,513,453

MAGNETIC CORE MEMORY PLANE ASSEMBLY AND METHOD

Filed Jan. 5, 1968

INVENTOR
Robert S. Fow
BY Carl V. Olson
ATTORNEY

United States Patent Office 3,513,453
Patented May 19, 1970

3,513,453
MAGNETIC CORE MEMORY PLANE ASSEMBLY AND METHOD

Robert S. Fow, Plymouth Meeting, Pa., assignor to RCA Corporation, a corporation of Delaware Filed Jan. 5, 1968, Ser. No. 695,944
Int. Cl. G11c *5/02, 11/02;* H01r *13/36*
U.S. Cl. 340—174 3 Claims

ABSTRACT OF THE DISCLOSURE

A magnetic core memory plane including an insulating planar support, an array of magnetic cores, and wires extending through rows and columns of cores to electrical terminals on the planar support. Each terminal is constructed of an elongated metallic member of rectangular cross section extending perpendicularly from the planar surface of the support. The free end of the metallic member is bent sharply back toward the planar support to form a wire receiving and gripping notch. In assembly, a wire is passed straight through the notch of a terminal, through a row of aligned cores and through the notch of a terminal on the opposite side of the frame. The ends of the wires are then jerked upwardly causing the wire ends to be clamped and broken off in the terminals.

BACKGROUND OF THE INVENTION

Magnetic core memories commonly employed in electronic computers are being constructed using magnetic cores of smaller and smaller physical sizes. Very small cores have the advantages that they can be switched more quickly from one magnetic state to the other, they require small driving pulses, and they can be packed more closely together to reduce the propagation delays of pulses transmitted through wires linking the cores. It is possible to employ magnetic cores having an outer diameter of about 14 milliinches and an inner diameter of about 9 milliinches and to arrange the cores in rows and columns with a spacing between parallel wires linking the cores of about 20 milliinches. In this case, the wire threading the cores may be No. 42 magnet wire. When cores and wires of such small physical sizes are employed, serious problems are encountered in terminating ends of the wires for the purpose of making connections to electronic driving and sensing circuitry. Memory wire terminating structures of the prior art are not entirely satisfactory for use with very small cores and wires. It is therefore a general object of this invention to provide an improved magnetic core memory plane construction and method suitable for use with very small cores and fine wires, and characterized in that the establishment of physical and electrical connections between fine wires and conductive terminal members is simply and reliably accomplished.

Memory organizations most commonly used in the past have lent themselves to construction in the form of a stack of individual magnetic core memory planes. Memory planes intended for use in a memory stack have been constructed with a view to convenience in the stacking of the individual planes. Greater use is now being made of a so-called 2½D (dimension) memory organization in which the entire memory may be constructed in a single plane, rather than the stack of individual planes. It is therefore another object of this invention to provide an improved memory plane construction which is particularly advantageous for use in memories having the 2½D organization.

SUMMARY OF THE INVENTION

In accordance with an example of the invention, a magnetic core memory plane is constructed of a planar insulating support, an array of magnetic cores arranged in rows and columns, and wires extending through the cores in the row and column directions and terminating in electrical terminals mounted on the insulating support. Each electrical terminal consists of an elongated metallic member of rectangular cross section extending perpendicularly from the planar surface of the support with the free end bent sharply back toward the planar support to provide a wire receiving and gripping notch.

In accordance with the method of assembly, the magnetic cores are held in the support or frame with their apertures in alignment with the open ends of terminals on the sides of the frame. Wires are passed straight through the aligned terminals and cores. The ends of the threaded wires are jerked upwardly to break off the ends at the terminals.

DESCRIPTION OF THE PREFERRED EMBODIMENT

Figure 1:
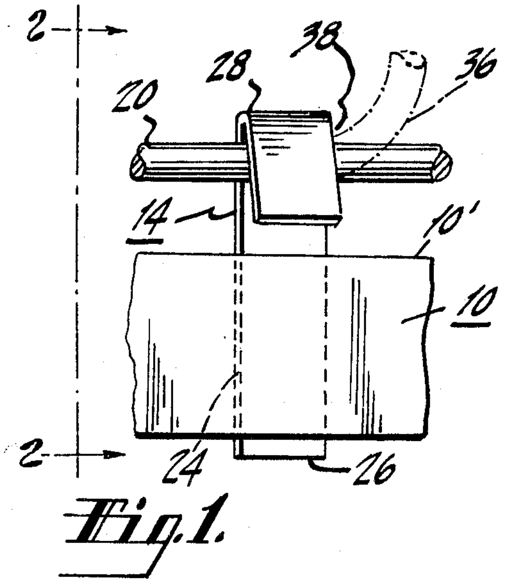
FIG. 1 is an elevation showing an electrical terminal holding and gripping a memory wire in fixed relation to an insulating support, the construction being in accordance with the teachings of this invention.
Figure 2:
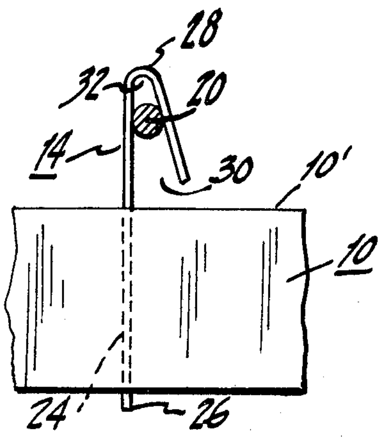
FIG. 2 is a side elevation of the construction shown in FIG. 1, looking in the direction of the arrows 2—2 in FIG. 1.

Reference is now made in greater detail to the three figures of the drawing wherein there is shown a magnetic memory plane including a planar support 10 of insulating material. The support 10 may be a continuous rectangular sheet, or it may be a sheet provided with a rectangular central opening 12 leaving a planar frame on which metallic terminals 14 are mounted. The terminals along each side of the support or frame 10 are arranged in tiers to increase the spacing between adjacent terminals. Coextensive with the central area of, or opening in, the support or frame 10 is an array of magnetic cores 16 arranged in rows and columns. Wires 20 extend from terminals on one side of the support 10 through respective rows of cores to terminals on the opposite side of the support. Similarly, wires 22 extend from another side of the support through respective columns of cores to terminals on the opposite side of the support.

Each terminal 14 comprises an elongated metallic member having an end 24 anchored in any suitable way in the insulaing support 10, and provided at 26 with any suitable means for connection to electronic drive and sense circuitry. The free end of the metallic member 14 is bent sharply back at 28 toward the planar surface 10′ of the support 10. The line along which the bend at 28 is made is in a direction parallel with the greater cross sectional dimension of the metallic member 14. The free end of metallic member 14 is bent sharply back in a manner to form a wire receiving and gripping notch for the wire 20. The notch is dimensioned at its open end 30 to freely receive the wire 20, and has a dimension at its closed end 32 which is less than the dimension of the wire 20. The bend at 28 in the metallic member 14 is in a direction parallel with the direction of the wire 20 engaged in the notch.

Figure 3:
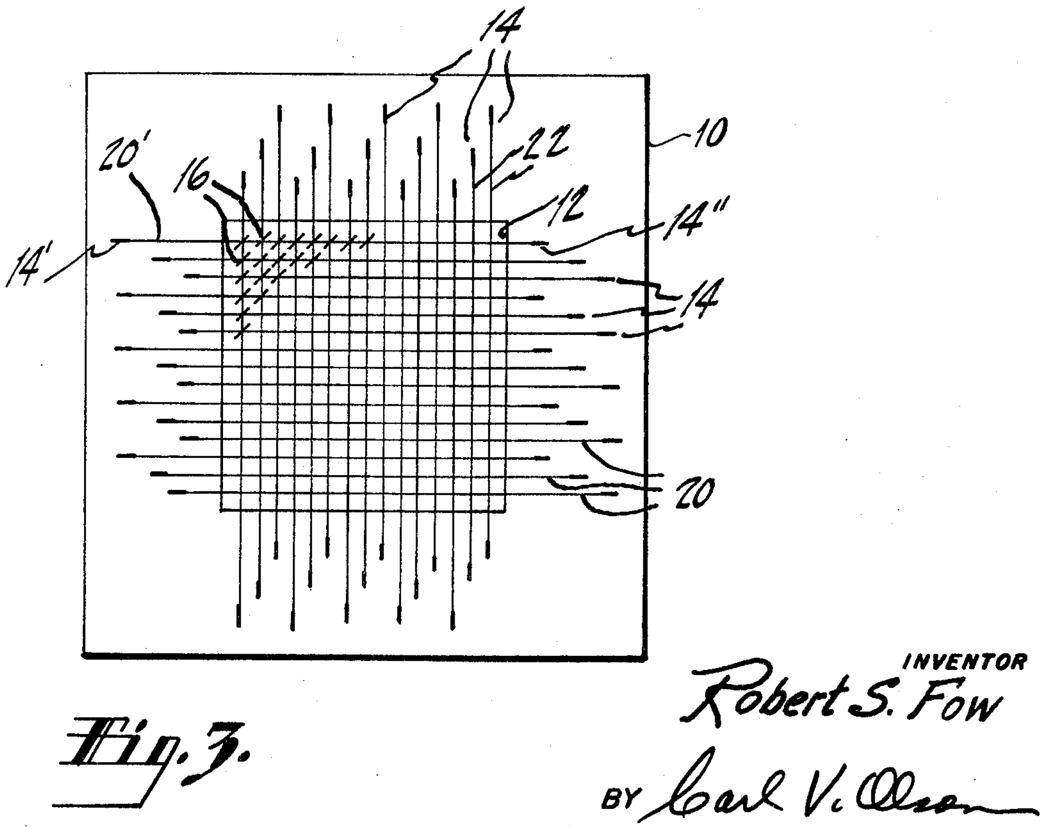
FIG. 3 is a plan view of a magnetic core memory plane including many terminals and wires each constructed as shown in detail in FIGS. 1 and 2.

The assembly of a magnetic core memory plane as shown in FIG. 3 may be accomplished by supporting the array of magnetic cores 16 on edge by means of an adhesive sheet so that the apertures in the cores 16 are freely accessible for stringing. A first wire 20′ may be passed from the left-hand margin of the frame 10 through the open end 30 of the notch in metallic member 14′, through the corresponding first row of magnetic cores 16 and through the open end 30 of the metallic member 14''.

The openings in the terminals and cores 16 are all in alignment so that a straight pass of the wire 20' is easily made. The ends of the wire 20' extending beyond the edges of the frame 10 may be manually tensioned and drawn upwardly into the notches in the metallic members 14' and 14''. A wire end may easily be pulled or jerked upwardly, as shown at 36 in FIG. 1, to cause the wire to be broken off in the closed end 32 of the notch. When this operation is completed at both ends of the wire 20', the wires and the cores threaded by the wires are firmly held on the frame 10. The same procedure is followed in threading and fixing all the other wires 20 and 22 of the core plane. Thereafter, the electrical connections at the points where the wires are gripped and broken off in the notches can conveniently be perfected by soldering, as at 38, or other means.

The described method, according to the invention, of assembling a magnetic core plane has many advantages over prior known methods in which a wire is wrapped around a post or is redirected through a hole in a terminal where the hole is not in perfect alignment with the cores. The prior methods require a considerable skill and dexterity on the part of the operator. Also, the prior methods involve an undesirable bending, redirecting, flexing and pulling of the parts of the wire that remain in the final assembly. This can result in damage to the very fine wire and to its thin coating of insulating material.

While the magnetic core memory plane shown in FIG. 3 is provided with terminals 14 on all four sides of the frame, in some applications it may be desirable to use the described terminals 14 on solely one side of the frame, or on fewer than all sides of the frame.

The described magnetic core memory plane construction includes metallic member terminals which are relatively easy to fabricate in small sizes, which are designed to provide maximum strength in needed directions, and which have significant advantages in the ease with which the memory plane wires can be directed through the terminals and the cores and the ease with which the excess ends can be neatly broken off.

What is claimed is:

1. A magnetic care memory plane comprising a planar support of insulating material, an array of magnetic cores arranged in rows and columns, wires extending from one side of said support through respective rows of cores to the opposite side of said support, wires extending from another side of said support through respective columns of cores to the opposite side of said support, and electrical terminals for respective wires along the sides of said support, wherein the improvement comprises a construction of each said terminal along at least one side of the support in the form of an elongated metallic member of rectangular cross section extending perpendicularly from the planar surface of said planar support with the free end bent sharply back toward the planar support to form a wire receiving and gripping notch, said notch being dimensioned at its open end to freely receive said wire and having a dimension in its closed end which is less than the diameter of said wire.

2. A magnetic core memory plane comprising a planar support of insulating material, an array of magnetic cores arranged in rows and columns, wires extending from one side of said support through respective rows of cores to the opposite side of said support, wires extending from another side of said support through respective columns of cores to the opposite side of said support, and electrical terminals for respective wires along the sides of said support, wherein the improvement comprises a construction of each said terminal along at least one side of the support in the form of an elongated metallic member of rectangular cross section extending perpendicularly from the planar surface of said planar support with the free end bent sharply back toward the planar support along a line extending in the direction of the greater cross sectional dimension of the member and in the direction of said wire, said elongated metallic member being bent to form a notch which is dimensioned at its open end to freely receive said wire and which has a dimension in its closed end that is less than the diameter of said wire.

3. A magnetic core memory plane comprising a planar support of insulating material, an array of magnetic cores arranged in rows and columns, wires extending from one side of said support through respective rows of cores to the opposite side of said support, and electrical terminals for respective wires along at least one side of said support, each said terminal being in the form of an elongated metallic member of rectangular cross section extending perpendicularly from the planar surface of said planar support with the free end bent along a line in the direction of the greatest cross sectional dimension back toward the planar support at an acute angle to provide a notch having an inner dimension at the bend which is less than the diameter of said wire and to provide a dimension at the open end which is greater than the diameter of said wire, said wires being wedged in the notches of respective terminals and severed at the outward edges of the notches thereof.

References Cited

UNITED STATES PATENTS

| | | | |
|---|---|---|---|
| 2,664,553 | 12/1953 | Epstein ____________ | 339—220 |
| 3,008,130 | 11/1961 | Devaud et al. | |
| 3,060,402 | 10/1962 | Olsson et al. _____ | 339—258 XR |
| 3,221,285 | 11/1965 | Jackson et al. | |

MARVIN A CHAMPION, Primary Examiner

P. A. CLIFFORD, Assistant Examiner

U.S. Cl. X.R.

29—413, 604, 628; 225—6; 339—17, 258, 273